(12) United States Patent
Formenti et al.

(10) Patent No.: US 7,408,326 B2
(45) Date of Patent: Aug. 5, 2008

(54) BATTERY PACK SYSTEM INTERFACE WITH MULTIPLE MODE CONTROL STATES

(75) Inventors: Jose Antonio Vieira Formenti, Allen, TX (US); Garry Ross Elder, Spratton (GB)

(73) Assignee: Texas Instruments Incorporated, Dallas, TX (US)

( * ) Notice: Subject to any disclaimer, the term of this patent is extended or adjusted under 35 U.S.C. 154(b) by 628 days.

(21) Appl. No.: 11/102,149

(22) Filed: Apr. 8, 2005

(65) Prior Publication Data

US 2006/0226814 A1    Oct. 12, 2006

(51) Int. Cl.
*H02J 7/06* (2006.01)
(52) U.S. Cl. .................. 320/163; 320/158; 320/106
(58) Field of Classification Search .......... 320/106, 320/158, 163
See application file for complete search history.

(56) References Cited

U.S. PATENT DOCUMENTS 5,680,027 A * 10/1997 Hiratsuka et al. ........... 320/106

2007/0148539 A1 * 6/2007 Pellenc ...................... 429/156

* cited by examiner

*Primary Examiner*—Adolf Berhane
*Assistant Examiner*—Aaron Piggush
(74) *Attorney, Agent, or Firm*—Wade J. Brady, III; Frederick J. Telecky, Jr.

(57) ABSTRACT

A system interface having an interface for dual battery packs provides for power up sequencing of battery packs and pack switching under the control of a host processor within associated system electronics. The host processor communicates with each battery pack via a pack interface that includes a single wire mode control signal and a single wire status signal. The mode control signal allows the host processor to control the operational mode of selector switches within the respective battery pack. The single wire status signal provides status information to the host processor regarding the state of the selector switches within the respective battery pack. The mode and status signals are multi-state signals that permit at least three states to be identified via the single wire interface. Selector switches are provided only in the battery packs. No selector switches are included in the system electronics to minimize voltage drops between the selected battery pack and the system electronics.

12 Claims, 12 Drawing Sheets

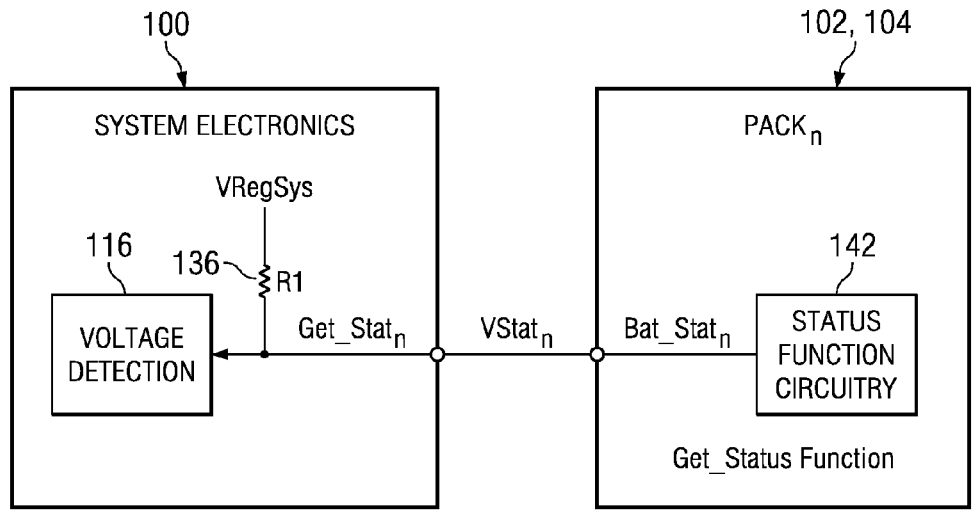

FIG. 4a

| PACK STATUS<br>PACK CONNECTED TO<br>SYSTEM ELECTRONICS | SWP1 | SWP2 | Get_Stat$_n$ = Vstat$_n$ =<br>Bat_Stat$_n$ |
|---|---|---|---|
| STANDBY Mode Set<br>All Pack MOSFETs Off | OFF | OFF | 1.76V  V5+<br>1.52V  V5− |
| DIODE-OR Mode Set<br>PChg/DChg MOSFETs On<br>Chg MOSFET Off | ON | OFF | 1.28V  V4+<br>1.04V  V4− |
| ON Mode Set<br>Chg/DChg MOSFETs On<br>PChg MOSFET Off | DON'T<br>CARE | ON | .8V<br>GND |
| PACK NOT CONNECTED TO<br>SYSTEM ELECTRONICS | SWP1 | SWP2 | Bat_Stat$_n$ | Get_Stat$_n$ |
| Pack in SLEEP Mode | OFF | OFF | GND | VRegSys |

FIG. 4b

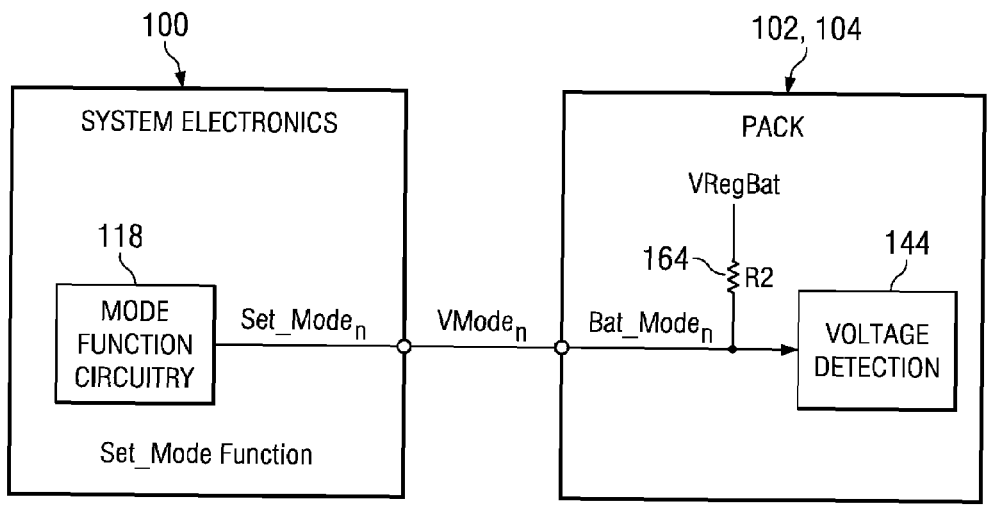

FIG. 5a

| PACK COMMAND PACK CONNECTED TO SYSTEM ELECTRONICS | SYSTEM CONTROLS | | | Set_Mode$_n$ = VMode$_n$ = Bat_Mode$_n$ | |
|---|---|---|---|---|---|
| | SWS1 | SWS2 | SWS3 | | |
| Set pack in SLEEP mode | OFF | ON | OFF | > 2 V | |
| Set pack in STANDBY mode Chg/DChg/PChg MOSFETs Off | ON | OFF | OFF | 1.76V<br>1.52V | V2+<br>V2− |
| Set pack in DIODE-OR mode PChg/DChg MOSFETs On, Chg MOSFET Off | OFF | OFF | OFF | 1.28V<br>1.04V | V1+<br>V1− |
| Set pack in ON mode Chg/DChg MOSFETs On, PChg MOSFET Off | DON'T CARE | ON | ON | .8V<br>GND | |
| PACK NOT CONNECTED TO SYSTEM ELECTRONICS | SWS1 | SWS2 | Bat_Mode$_n$ | Set_Mode$_n$ | |
| Pack in SLEEP mode | OFF | OFF | VRegBat | GND | |

FIG. 5b

BATTERY PACK SYSTEM INTERFACE WITH MULTIPLE MODE CONTROL STATES

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention pertains to electronic equipment used in portable applications and, more specifically, to an interface between the system electronics in portable electronic equipment having dual battery packs that provides for the sequencing and switching of power to the system electronics and the battery packs.

The utility of electronic equipment used in portable applications, such as notebook computers, is often limited by the runtime that is possible when the equipment is battery powered. One common technique for extending the runtime of portable electronic equipment has been to provide for 2 distinct battery packs. Typically, the battery packs are removably mountable within a housing that contains the system electronics.

The use of two battery packs requires the implementation of a selector that connects one battery pack positive terminal to the system or charger while isolating the other pack from the system. The selector is traditionally implemented as a MOSFET switch array included in the system electronics.

Each battery pack in a traditional system usually includes a protection circuit and a pack control unit that together provide safety functions and control discrete MOSFETs that connect the pack cells to the pack positive terminal. In this implementation, the pack control unit identifies when the pack is connected to the system electronics, usually by measuring a voltage level, and enables the connection of the pack cells to the pack positive terminal by turning on the pack charge and discharge MOSFETs. A host processor within the system electronics follows a specific algorithm and connects one of the packs (when in dual pack mode) to the power bus that supplies the system.

This topology has been widely used in the industry with only minor variations in the implementation of the selector located on the system side. This architecture, however, has noted disadvantages, namely, the additional costs that are a direct result of the use of discrete MOSFET switches on the system side and additional power dissipation that also results from the use of such switches. Additionally, as a result of the additional voltage drop across the system side MOSFET devices used to implement the selector function, the runtime that is achieved from a battery pack is adversely affected.

It would therefore be desirable to provide an interface between the system electronics used in a portable electronic device that allows the use of battery packs and that avoids the above-described disadvantages of traditional architectures in battery powered systems.

BRIEF SUMMARY OF THE INVENTION

In accordance with the present invention, an improved architecture for a portable electronic device that accomodates dual battery packs and an improved interface between the portable electronic device and the battery packs is disclosed.

The system and method herein described specify how the system electronics and electronics within the respective battery packs are powered and how changes in the source of power are made. The power for the system electronics and the electronics within the respective battery packs may be obtained from an AC adapter if connected, or from one of two battery packs coupled to the system electronics (if two packs are installed).

The sole selector switches are provided within the battery packs. Each battery pack includes a status function circuit that is cooperative with a resister in the system electronics to establish a first voltage that is indicative of the state of the selector switches within the respective battery pack. The first voltage may be one of a plurality of predefined levels. The status voltage is sensed by a status function voltage detector within the system electronics. The status function voltage detector produces outputs that are coupled to a host processor to permit the host processor to determine the state of the selector switches.

The operational mode of each battery pack is established by a respective mode function circuit within the system electronics that is controlled by the host processor. The mode function circuit comprises a resistive network that is selectively configured under the control of the host processor. More specifically, the host processor controls certain switches within the resistive network to control the equivalent resistance of the network. The output of the resistive network is coupled to a resistor within the corresponding battery pack to establish a mode control voltage within the battery pack. A voltage detector within the battery pack produces a plurality of outputs that are employed by a battery management unit (BMU) to control the state of the selector switches within the battery pack through driver logic.

The outputs from the BMU to the driver logic are overridden by overvoltage and overcurrent conditions detected on overvoltage and overcurrent detection circuitry located on the respective battery pack. Thus, if no overvoltage, overcurrent or other safety related conditions are detected by the battery pack circuitry, the state of the pack selector switches is determined by the system side command provided by the host processor.

Power up sequencing for the system electronics and pack switching is performed under the control of the host processor.

The presently disclosed system may be employed in notebook computers including one or two battery packs or other portable electronic devices where it is desirable to provide multiple battery packs to extend the period of portable operation while allowing switching between the battery packs.

Other features, aspects and advantages of the presently disclosed system and method for controlling battery pack sequencing in a system that accommodates two battery packs will be apparent to those of ordinary skill in the art from the Detailed Description of the Invention that follows.

BRIEF DESCRIPTION OF THE SEVERAL VIEWS OF THE DRAWINGS

The invention will be more fully understood by reference to the Detailed Description of the Invention that follows in conjunction with the Drawings of which:

FIG. 4a is a schematic diagram illustrating the operation of the status function including the status function circuitry in the battery pack and status function voltage detector logic;

FIG. 4b is a table illustrating switch settings within the status function circuitry and the corresponding output signal for specified selector switch states;

FIG. 5a is a schematic diagram illustrating the operation of the mode function including mode function circuitry in the system electronics and mode function voltage detector logic in the battery pack;

FIG. 5b is a table illustrating switch settings within the mode function circuitry and the corresponding output signal in response to host processor controls;

DETAILED DESCRIPTION OF THE INVENTION

Figure 1:
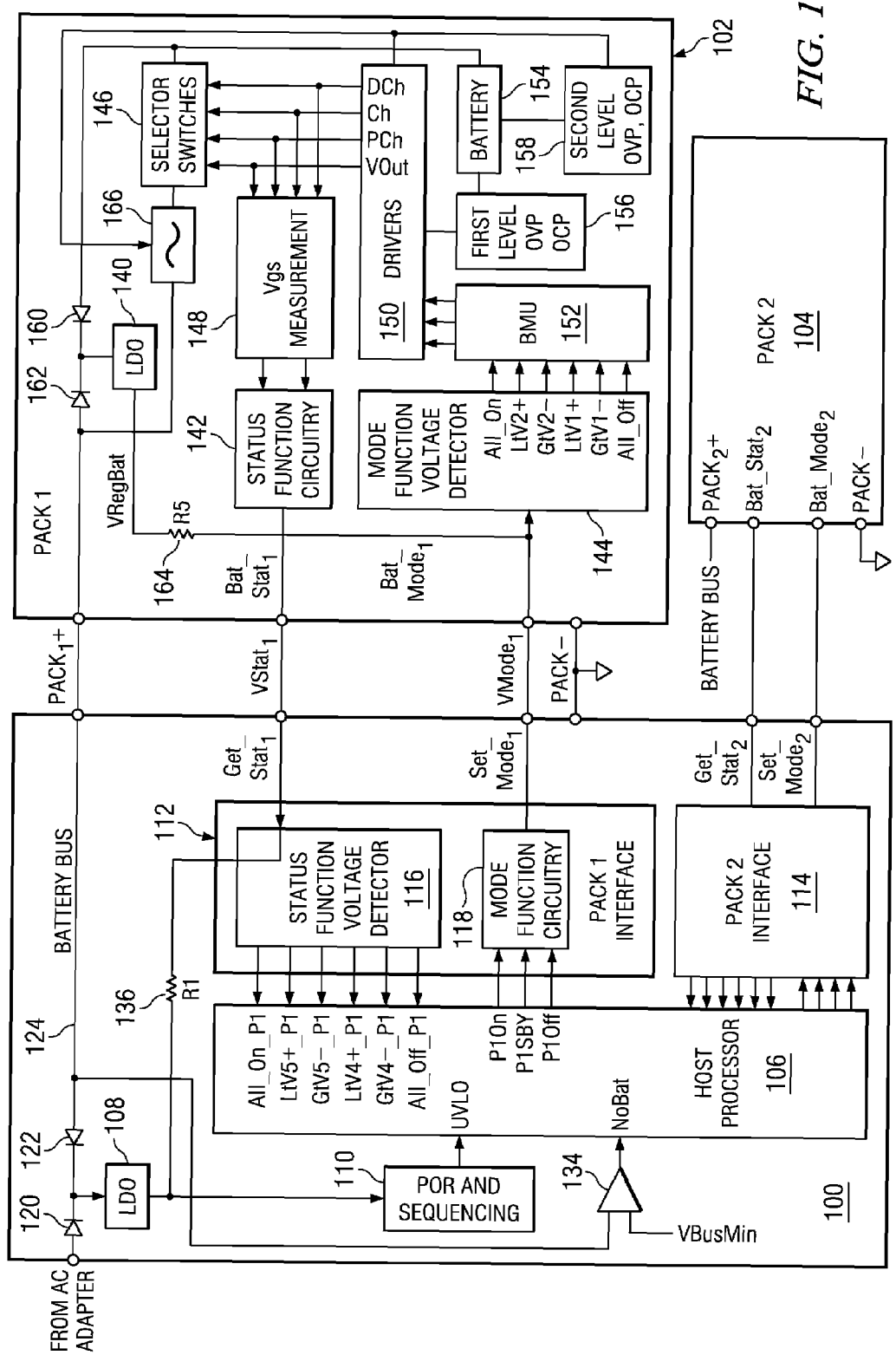
FIG. 1 is a schematic diagram of a system in accordance with the present invention including system electronics and two battery packs.

In accordance with the present invention an improved dual battery pack system interface and method for sequencing battery packs in such a system is disclosed. Referring to FIG. 1, the system includes system electronics 100, a first battery pack 102 and a second battery pack 104. System electronics 100 are powered from an AC adapter (not shown) or from a battery bus 124. The battery bus 124 is powered by one of two battery packs 102, 104 that may be electrically coupled to the system electronics via a system interface. Additionally, selected electronics within each battery pack are powered either by the cells within the respective battery pack or alternatively, by the cells of the other battery pack, under the control of a host processor 106 within the system electronics 100.

System Electronics

The system electronics 100 include a first low dropout regulator 108, power up and sequencing logic 110, pack 1 interface logic 112 for interfacing the system electronics 100 to the first battery pack 102, and pack 2 interface logic 114 for interfacing the system electronics 100 to the second battery pack 104. The pack 1 interface circuitry 112 and the pack 2 interface circuitry 114 are the same. The pack 1 interface circuitry 112 is described below with the understanding that the description is equally applicable to the pack 2 interface circuitry 114.

Pack Interface Circuitry

The pack 1 interface circuitry 112 includes a status function voltage detector 116 and mode function circuitry 118. The status function voltage detector 116 generates a plurality of outputs that are coupled to the host processor 106. The status function voltage detector outputs are established based upon the input voltage to the status function voltage detector 116 on signal line Get_Stat$_1$. The voltage on the Get_Stat$_1$ signal line is determined by the status function circuitry 142 in pack 1 102 when that battery pack is coupled to the system electronics 100. More specifically, referring to FIG. 3, the inputs to the status function circuitry 142 determine whether SWP1 and SWP2 are open, SWP1 is closed and SWP2 is open or whether SWP2 is closed (the SWP1 status in this circumstance being a don't care condition). With SWP1 and SWP2 open, the voltage on the Bat_Stat$_1$ signal line is established by a voltage divider formed by resister R4 166 in the status function circuitry 142 and resister R1 136 within the system electronics. When SWP1 is closed and SWP2 is open, the voltage on Bat_Stat$_1$ is determined by the equivalent resistance formed by the parallel combination of resistors R4 166 and R6 170 and resister R1 136 within the system electronics 100. When SWP2 is closed, Bat_Stat$_1$ is at ground. The Bat_Stat$_1$ output signal is coupled to the input Get_Stat$_1$ of the status function voltage detector 116 via the interface signal VStat$_1$. The state of the status function circuitry 142 in pack 1 102 is set under the control of Vgs measurement logic 148 as is subsequently discussed.

Mode Function Circuitry

Figure 2:
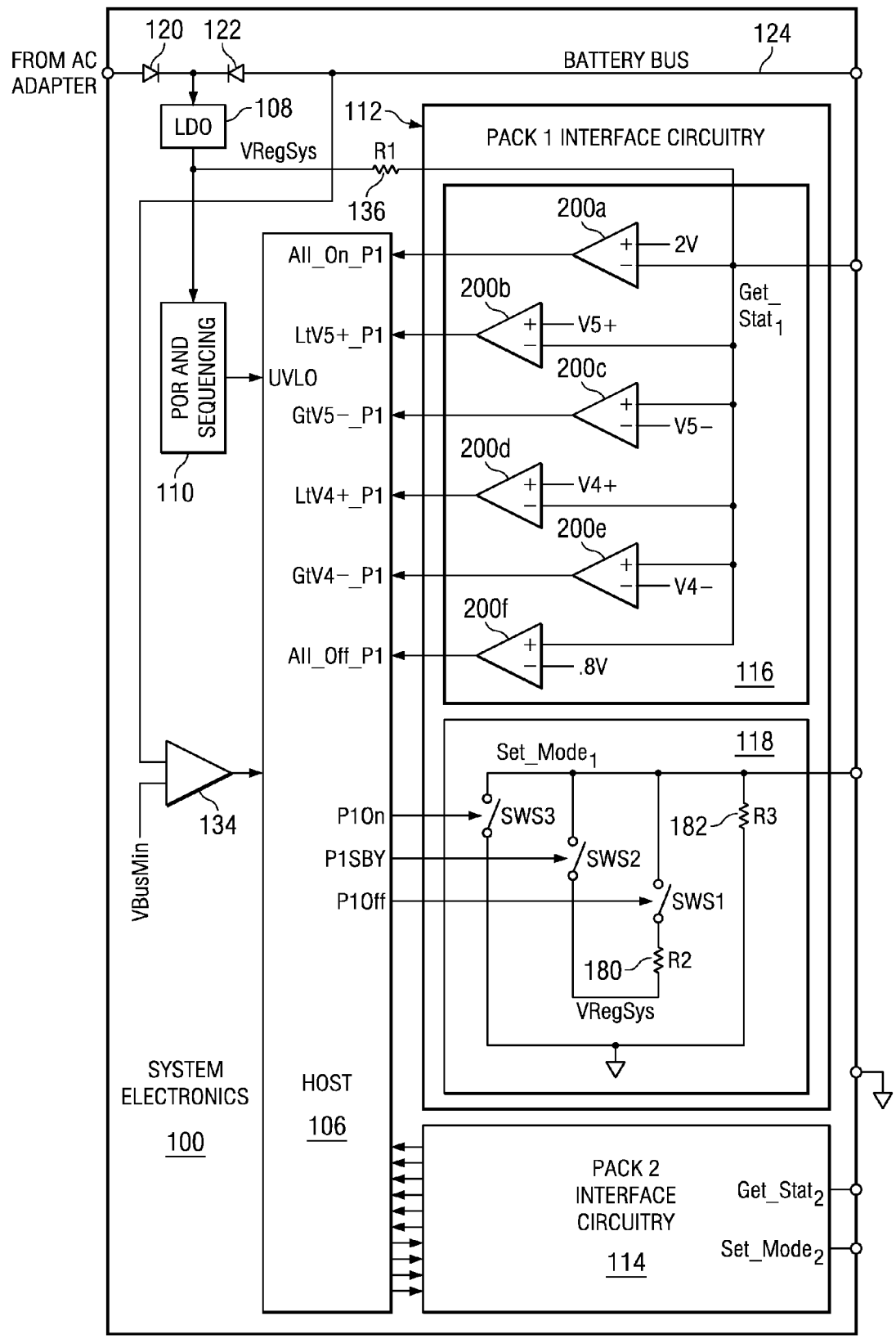
FIG. 2 is a more detailed schematic diagram of the system electronics of FIG. 1 illustrating the status function voltage detector logic and the mode function circuitry.

The mode function circuitry 118 has a plurality of inputs that are selectively connected by switches driven by the host processor 106 to control the voltage on the output signal Set_Mode$_1$. More specifically, referring to FIGS. 1 and 2, the mode function circuitry 118 receives three control inputs from the host processor 106, namely, P1ON, P1SBY and P1OFF. The three control inputs control switches SWS3, SWS2 and SWS1. When P1ON is asserted, switch SWS3 is closed and Set_Mode$_1$ is switched to ground. When P1SBY is asserted, switch SWS2 is closed and Set_Mode$_1$ is set to the voltage VRegSys which is generated by low drop out regulator 108 (FIG. 2). When P1OFF is asserted, switch SWS1 is closed and the voltage on Set_Mode$_1$ is established by the resistive network involving R2 180 and R3 182 within the mode function circuitry 118 and resistor R5 164 in pack 1 102.

The output signal Set_Mode$_1$ is coupled to the input of the mode function voltage detector 144 within pack 1 via the interface signal VMode$_1$. The voltage at the input of the mode function voltage detector 144 may be one of a plurality of predetermined voltage levels that are selectively established under the control of the host processor 106.

The pack 2 interface 114 and the second battery pack 104 are cooperative in the same manner as the pack 1 interface 112 and the first battery pack 102 and employ circuitry and signaling as described.

Low Drop Out Regulator

The LDO 108 can receive power either from an external AC adapter (not shown) through a first steering diode 120 or from the battery bus 124 through a second steering diode 122. The LDO 108 produces a regulated DC voltage VRegSys that is used by the circuitry within the system electronics 100.

Pack Presence Comparator

The system electronics 100 further includes a comparator 134 that has one input coupled to the battery bus 124 and a second input coupled to a VBusMin threshold voltage. The output of the comparator 134 is coupled to the host processor 106 to provide an indication to the processor 106 whether a battery pack is present. If the voltage on the Battery Bus 124 is greater that the threshold voltage VBusMin, the comparator 134 produces an output voltage that indicates that at least one battery pack is present. If the voltage on the Battery Bus 124 is less than the threshold voltage VBusMin, the comparator 134 produces an output voltage that indicates that no battery pack is present.

Battery Pack Circuitry

The battery packs 102, 104 each include a low drop-out regulator 140, the status function circuitry 142, the mode function voltage detector 144, selector switches 146, Vgs measurement logic 148, driver logic 150, a battery management unit (BMU) 152, a battery 154 comprising a plurality of cells, first level overvoltage (OVP) and overcurrent circuitry (OCP) 156 and second level overvoltage and/or overcurrent circuitry 158. It will be appreciated that the pack 1 and pack 2 interface circuitry are the same. The descriptions herein regarding the pack 1 circuitry 102 are equally applicable to the pack 2 circuitry 104.

The low drop-out regulator 140 within pack 1 is powered by either the battery 154 through a first diode 160 or from an external source through a second diode 162. The LDO 140 produces a regulated output voltage that is coupled to resistor R5 164 that produces a voltage drop determined by the status of the mode function circuitry 118 in the pack 1 interface 112 of the system electronics 100. One end of the resistor R5 164 is coupled to the LDO 140 output and the other end of the resistor R5 164 is coupled to the input Bat_Mode$_1$ of the mode function voltage detector 144 and the mode function circuitry 118.

Mode Function Voltage Detector

The mode function voltage detector 144 receives the Bat_Mode$_1$ input signal and produces a plurality of outputs that collectively indicate the voltage level of the Bat_Mode$_1$ signal, i.e. a plurality of predetermined voltage levels that such signal may assume based on the state of the mode function circuitry 118.

Selector Switches

The selector switches 146 comprise a plurality of MOSFET devices as subsequently discussed in greater detail. The selector switches 146 are used to selectively couple the battery 154 to the Pack+ output. The selector switches 146 are configurable in one of several configurations under the control of driver logic 150 as is subsequently described.

Overcurrent, Overvoltage Protection

Each battery pack 102, 104 includes first level overvoltage and overcurrent protection logic 156 the monitors the voltage of the battery 154 and the current being supplied by the battery 154 and generates a fault indication in the event the battery voltage or current exceeds predetermined voltage or current thresholds. Additionally, each battery pack 102, 104 includes second level overvoltage and overcurrent logic 158 that provides additional protection to the system in the event of an overvoltage or overcurrent condition. In the event the second level overvoltage and overcurrent protection logic 158 detects an overvoltage or overcurrent condition, the logic 158 causes the circuit breaker 166 to open.

Ssytem Electronics/Pack Interface Signals

The interface signals between the system electronics 100 and the first battery pack 102 that are relevant to the present discussion include the Pack+ line that couples the battery bus 124 to each battery pack, the Pack− line that establishes the ground or common reference between the system electronics 100 and the battery pack 102, the VStat$_1$ signal that conveys status information regarding that status of the selector switches to the status function voltage detector 116, and the VMode$_1$ signal that conveys the mode information to establish which of the selector switches are open and which are closed.

Status Function Operation

More specifically, the pack 1 interface circuitry 112 includes the status function voltage detector 116 comprising a plurality of comparators 200a-200f. Each one of the comparators 200a-200f has one input coupled to the Get_Stat$_1$ signal and the other input connected to a predetermined voltage to establish a voltage threshold for the respective comparator. The outputs of the comparators 200a-200f indicate the voltage level of the Get_Stat$_1$ signal which may be one of a plurality of predetermined voltages. The specific voltage of the Get_Stat$_1$ signal indicates which selector switch(es) 300, 302, 304 (FIG. 3) within pack 1 102 are open and which switch(es) are closed. The operation of the status function voltage detector 116 in conjunction with the status function circuitry 142 to provide the status of the selector switches 146 is further illustrated by reference to FIGS. 4a and 4b. The outputs of the status function voltage detector 116 are coupled to the host processor 106 to permit the host processor 106 to ascertain the status of the selector switches 300, 302, 304.

The pack 1 status function circuitry 142 controls the voltage on the Get_Stat$_1$ signal. The status function voltage detector 116 has inputs coupled to the Get_Stat$_1$ signal and produces outputs that are a function of the voltage on the Get_Stat$_1$ signal. FIG. 4a depicts the status function circuitry 142 in the pack and the system electronics in a simplified form, and FIG. 4b illustrates the ranges of the status function circuitry outputs that are associated with selector switch states. More specifically, if the status function voltage detector 116 determines that the voltage on the Get_Stat$_1$ signal is above 2.0V (i.e. pulled to VRegSys), such indicates to the host processor 106 that the first battery pack 102 is not connected. If the outputs of the status function voltage detector 116 indicate that the voltage on the Get_Stat$_1$ signal is between 1.52V and 1.76V, such indicates to the host processor 106 that the first battery pack 102 is inserted, that the charge MOSFET 300 (FIG. 3) is off, and that the discharge MOSFET 302 (FIG. 3) is off. For simplicity of discussion herein, if the voltage on the Get_Stat$_1$ signal is between 1.52V and 1.76V, the voltage is indicated as being "V5" or between V5+ and V5−.

If the outputs of the status function voltage detector 116 indicate that the voltage of the Get_Stat$_1$ signal is between 1.04V and 1.28V (V4), such indicates to the host processor 106 that the first battery pack 102 is inserted, that the charge MOSFET 300 is off, and that the discharge MOSFET 302 is on.

Finally, if the outputs of the status function voltage detector 116 indicate that the voltage of the Get_Stat$_1$ signal is between ground and 0.8V, such indicates to the host processor 106 that the first battery pack 102 is inserted, that the charge MOSFET 300 (FIG. 3) is on, and that the discharge MOSFET 302 (FIG. 3) is on. In another state, such indicates that the charge MOSFET 300 (FIG. 3) is on, and that the discharge MOSFET 302 (FIG. 3) is off.

Referring again FIG. 2, the comparators 200a-200f are employed to indicate to the host processor 106 whether the respective battery pack 102 is inserted and the status of the MOSFET switches 300, 302. More specifically, comparator 200a provides an output All_On_P1 that indicates whether the voltage on the Get_Stat$_1$ signal is greater than 2 V. If the Get_Stat$_1$ signal is greater than 2 V, as indicated above, such indicates to the host processor 106 that the battery pack 102 is not inserted. Comparators 200b and 200c are used to determine if the Get_Stat$_1$ signal is less then V5+ and greater then V5−. If the outputs Lt_V5+_P1 and GtV5−_P1 from comparators 200b and 200c are asserted, the host processor 106 determines that the voltage on the Get_Stat$_1$ signal is between V5+ and V5− indicating that the first battery pack 102 is inserted and that the charge MOSFET 300 is off and that the discharge MOSFET 302 is off.

Similarly, if the outputs LtV4+_P1 and GtV4_P1 from comparators 200d and 200e are asserted, such indicates to the host processor 106 that the voltage on the Get_Stat$_1$ signal is less than V4+ and greater than V4− which indicates to the host processor 106 that the first battery pack 102 is inserted, the charge MOSFET 300 is off, and the discharge MOSFET 302 is on.

Comparator 200f within the status function voltage detector 116 indicates if the voltage on the Get_Stat$_1$ signal is less than 0.8 Volts. If the Get_Stat$_1$ signal is less than 0.8 V, the comparator output signal All_Off_P1 is asserted indicating to the host processor 106 that the first battery pack 102 is inserted, the charge MOSFET 300 is on, and the discharge MOSFET 302 is on. In another state, a voltage on Get_Stat$_1$ less than 0.8V indicates that the charge MOSFET 300 is on and the discharge MOSFET 302 is off.

Vgs Logic

Vgs logic 148 has inputs coupled to the gates of the charge MOSFET 300, the discharge MOSFET 302, and the precharge MOSFET 304, and to the source of the charge and precharge MOSFETS 300, 304. The Vgs logic 148 produces outputs that control the status function circuitry 142 so as to produce predetermined voltages for Get_Stat$_1$ within the ranges depicted in FIG. 4a in response to the MOSFET states indicated in FIG. 4b. By way of example, when the first battery pack 102 is connected to the system electronics 100 and the charge and discharge MOSFETs 300, 302 are on, the Vgs logic 148 controls the status function circuitry 142 to turn on switch SWP2 to pull Bat_Stat$_1$ to ground. Thus, Get_Stat$_1$ is pulled to ground via the interface line VStat$_1$.

While the discussion above explains the operation of the status function circuitry 142 in conjunction with the status function voltage detector 116, it should be appreciated that a similar interface exists between status function circuitry 142 in the second battery pack 104 and a status function voltage detector 116 in the second battery pack interface 114 within the system electronics 100.

Mode Function Voltage Detector

Figure 3:
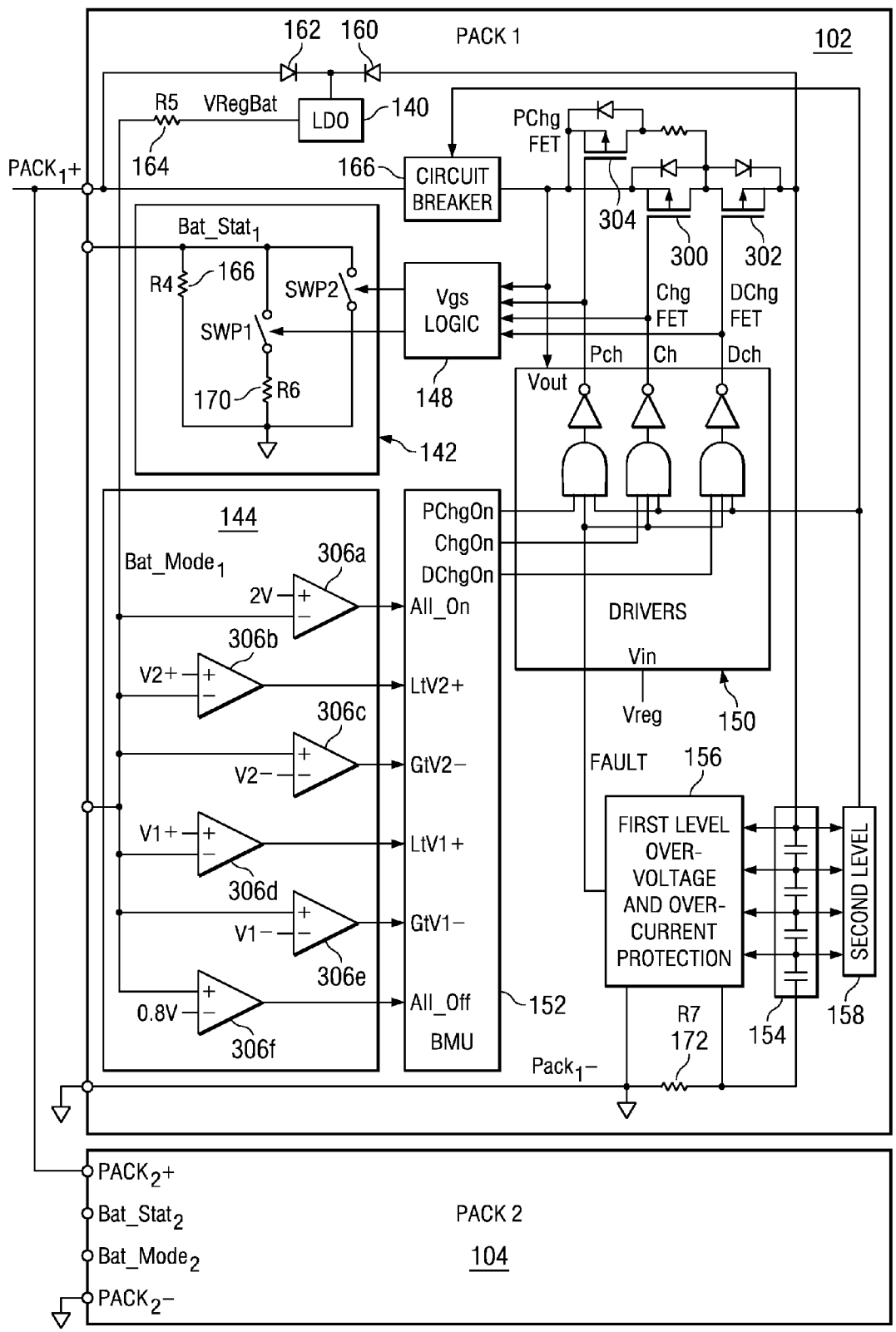
FIG. 3 is a more detailed schematic diagram of the battery pack logic of FIG. 1.

The mode function voltage detector 144 is shown in greater detail in FIG. 3. Referring to FIG. 3, the mode function voltage detector 144 includes comparators 306a-306f that each have one input coupled to the Bat_Mode$_1$ signal and the other input coupled to a reference voltage corresponding to one of the reference voltages depicted in FIG. 5. The outputs from the comparators 306a-306f are coupled to the battery management unit 152. The battery management unit 152 produces output signals PChgOn, ChgOn, and DChgOn that control the driver logic 150. The driver logic 150 couples the outputs of the battery management unit 152 to the gates of the precharge MOSFET 304, the charge MOSFET 300, and the discharge MOSFET 302 through gates that cause all the selector switch MOSFETS to be turned off in the event of a fault condition detected by the first level protection circuitry 156. The second level protection circuitry is operative to open the circuit breaker 166 (or fuse) in the event of the detection of a fault condition. Either the first level or the second-level protection circuitry 156 and 158 can override the operational mode of the pack that is established by the host processor in the event of a locally detected fault condition in the respective battery pack.

Mode Function Operation

The manner in which the state of the selector switches 300, 302, 304 are controlled by the host processor 106 via cooperative mode circuitry in the system electronics 100 and the first battery pack is described in greater detail below. The mode function circuitry 118 under the control of the host processor 106 in conjunction with the mode function voltage detector 144 are cooperative to control the state of the selector switches 146 in the first battery pack 102. More specifically, the mode function circuitry 118 in the first battery pack interface 112 is cooperative with the mode function voltage detector 144 in the first battery pack 102 to produce output voltages from the voltage detector that are employed to set the state of the selector switches 300, 302, 304.

The operation of the mode function circuitry 118 and the mode function voltage detectors 144 are explained in greater detail below with reference to FIGS. 2, 3, 5a and 5b. The mode function circuitry 118 receives control inputs P1ON, P1SBY and P1OFF from the host processor 106 (FIG. 2). These inputs determine whether switches SWS3, SWS2, and SWS1 are open or closed. The state of these switches establishes the voltage on the output signal Set_Mode$_1$ which is coupled to the input signal Bat_Mode$_1$ via the interface signal VMode$_1$. The Set_Mode$_1$ output signal is coupled to the resistor R5 164 in the first battery pack 102 when the first battery pack 102 is connected to the system electronics 100. The mode function voltage detector 144 in the first battery pack includes the plurality of comparators 306a-306f that monitor the voltage on the Bat_Mode$_1$ signal generally as discussed above with respect to the status function voltage detector 116.

The mode function voltage detector 144 in the first battery pack 102 produces a plurality of outputs that control the state of the selector switches 300, 302, 204. As depicted in FIG. 5b, if the mode function voltage detector 144 determines that the voltage on the Bat_Mode$_1$ signal is between ground and 0.8 V, the mode function voltage detector 144 for the respective battery pack produces output signals that turn on the charge MOSFET 300, turn on the discharge MOSFET 302, and turn off the pre-charge MOSFET 304. If the mode function voltage detector 144 determines that the voltage on the Bat_Mode$_1$ signal is between 1.04V and 1.28V (V1), the mode function voltage detector 144 for the respective battery pack produces output signals that turn off the charge MOSFET 300, that turn on the discharge MOSFET 302, and that turn on the pre-charge MOSFET 304. If the mode function voltage detector 144 determines that the voltage on the Bat_Mode$_1$ signal is between 1.52V and 1.76V (V2), the mode function voltage detector 144 for the first battery pack 102 produces output signals that turn off the charge MOSFET 300, turn off the discharge MOSFET 302 and turn off the pre-charge MOSFET 304 to place the first battery pack in standby mode. If the mode function voltage detector 144 determines that the voltage on the Bat_Mode$_1$ signal is above 2.0V, the mode function voltage detector 144 for the first battery pack 102 produces output signals that turn off the charge MOSFET 300, turn off the discharge MOSFET 302, and turn off the pre-charge MOSFET 304 placing the battery pack in a sleep mode.

The operation of the mode function interface between the second battery pack 104 and the system electronics 100 is the same as the operation of the mode function interface between the first battery pack 102 and the system electronics 100 as described above.

Pack Sequencing Upon Power Up

The operation of the presently disclosed system will be further understood by reference to the flowchart depicted in FIGS. 6a-6d. In FIGS. 6a-6d, blocks representing actions performed in the battery packs have continous borders of normal thickness and blocks respresenting actions performed in the system electronics 100 have continuous bold borders. Actions performed by a user, i.e. inserting a battery pack to connect the pack to the system electronics, are indicated with boxes having dashed borders.

Pack Sequencing

The power up sequencing of the system electronics 100 and the circuitry within the battery pack 102 upon pack insertion is discussed below with respect to FIGS. 6a-6d. The first scenario discussed is that in which the system electronics 100 is not connected to either an AC power adapter or a battery pack as depicted in box 600. In this state, the system electronics 100 are unpowered, the $Set\_Mode_1$ signal is at ground, and the $Get\_Stat_1$ signal is at ground. Additionally, the SWS1 and SWS2 switches within the mode function circuitry 118 are open. Box 602 depicts the state of a battery pack that is not coupled to the system electronics 100. When the first battery pack is not connected to the system electronics 100, $Bat\_Mode_1$ is pulled high to VRegBat, and the pack is in sleep mode with all selector switch MOSFETs 300, 302, 304 off. In this state, SWP1 and SWP2 are open and $Bat\_Stat_1$ is pulled to ground through resistor R4 166.

When a battery pack 102, 104 is connected via the respective battery pack interface 112, 114, as indicated in box 608, the applicable VStat signal voltage equals Gnd and $VMode=Set\_Mode=V1$. In response to the detection of $Bat\_Mode_1=V1$, as depicted in box 616 (FIG. 6b) the BMU sets the Precharge and Discharge MOSFETs 304,302 on and sets the charge MOSFET 300 off. This mode is referred to herein as the diode-or Mode. The battery pack generates an indication of the status of the MOSFETs on $Bat\_Stat_1$ which is coupled to $Get\_Stat_1$ via the $VStat_1$ interface. As illustrated in box 620, the system electronics 100 receive power from the battery pack via the discharge FET 302 and the precharge FET 304.

As depicted in box 622, in response to the receipt of power, the system host processor 106 powers up and reads the outputs from the status function voltage detector 116 to determine the status of the MOSFET selector switches.

The system electronics 100 communicates with the first battery pack 102 via a serial interface (not shown) to determine if the battery pack can be used as depicted in box 624. Control then passes to decision step 626 as is subsequently discussed in greater detail.

If the system electronics 100 are powered by an AC power adapter or another battery pack, the system electronics are powered. In this state, as illustrated in box 604, $Set\_Mode_n=Gnd$, and $Get\_Stat_n=VRegSys$. A battery pack that is not connected to the system electronics 100 is in sleep mode. In this state $Bat\_Mode_n=VRegBat$ and $Bat\_Stat_n=Gnd$ as illustrated in box 606. When a user connects the pack to the system electronics 100, the status signal $VStat_n=V5$ and the mode control signal $VMode_n=V1$. The pack detects the connection of the pack to the system electronics 100 as indicated at box 612 and sets the pack to the diode-or mode as illustrated at box 614. The pack reports the pack status via $VStat_n$ to the status function voltage detector for the respective battery pack. Control then passes to decision step 636 and the host processor 106 determines whether the selector switches were confirmed as being set to the proper state within the timeout period for the timeout timer.

When the user connects the external pack to the system electronics 100 as depicted in step 610, the system electronics 100 detects the fact that the pack has been connected and, as indicated in box 624, the system electronics communicates with the newly inserted pack to determine if the pack can be used. Control then passes to decision step 626.

A determination is then made whether the newly connected battery pack may be used as illustrated in decision step 626. If it is determined that the battery pack cannot be used, a fault indication is generated as illustrated in box 628. If the battery pack can be used, a determination is made whether the pack can be set to the diode-or mode within a predetermined time period. More specifically, as depicted at box 630 a timer is initiated. In decision steps 632 and 636 a determination is made whether the $Get\_Stat_1$ signal has been set to V4 (diode-or mode) within the specified time period. If the battery pack cannot be set to the diode-or mode within the predetermined time period Tout, a fault condition is indicated as illustrated in Box 634. If the host processor 106 determines that $Get\_Stat_1=V4$ indicating that the battery pack was set to the diode-or state within the timeout period, control passes to decision box 638 to determine whether any other pack is connected to the system. While in this illustration a determination is made whether pack 2 is connected, it should be recognized that pack 2 may have been the first pack connected to the system, in which case a determination is here made whether pack 1 is connected to the system. If no other pack is connected to the system, control passes to box 644 (FIG. 6c).

Figure 6A:
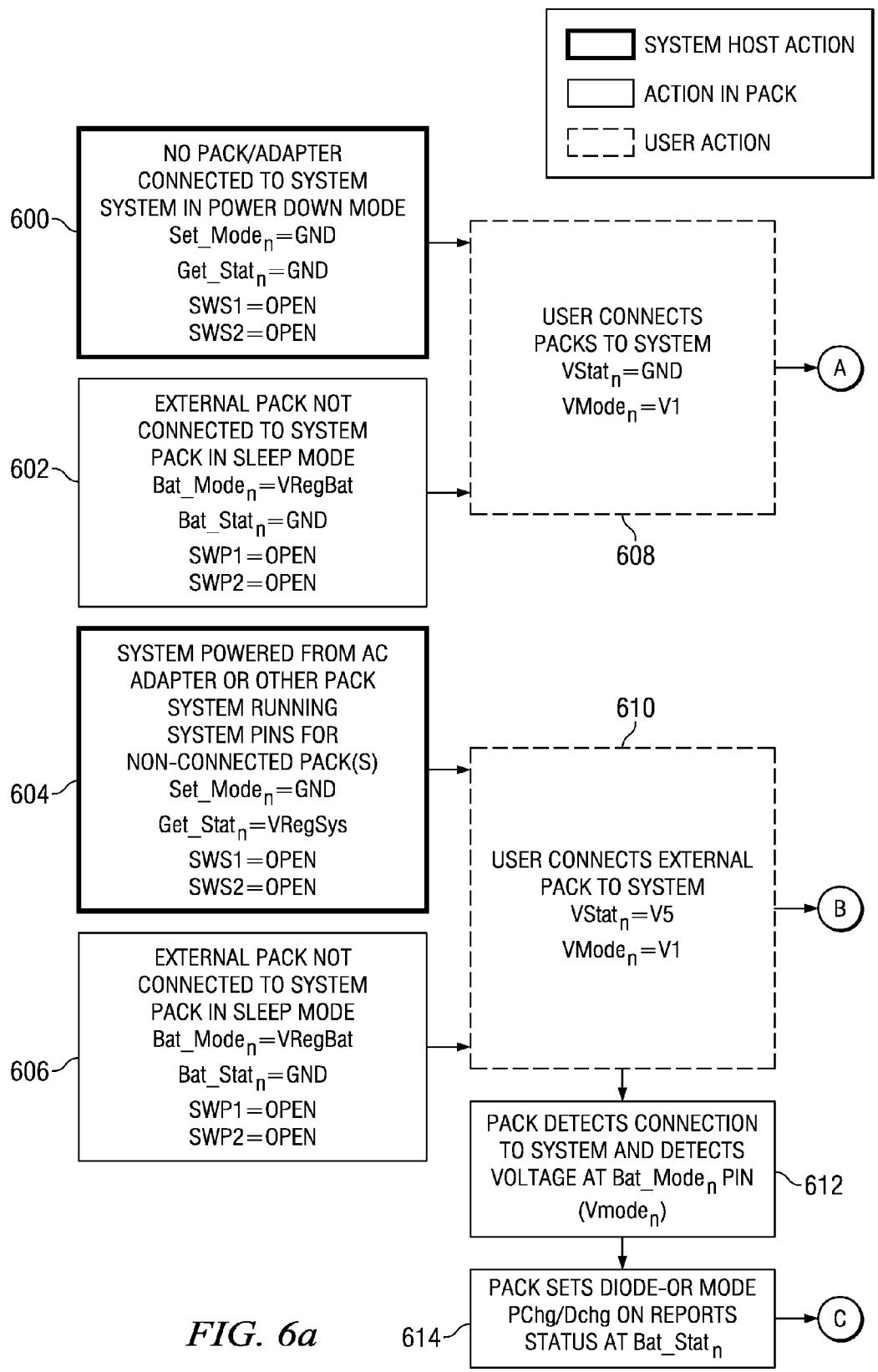
FIGS. 6a-6d comprise a flowchart depicting the power up and pack insertion sequencing for the system and pack electronics depicted in FIG. 1.
Figure 6B:
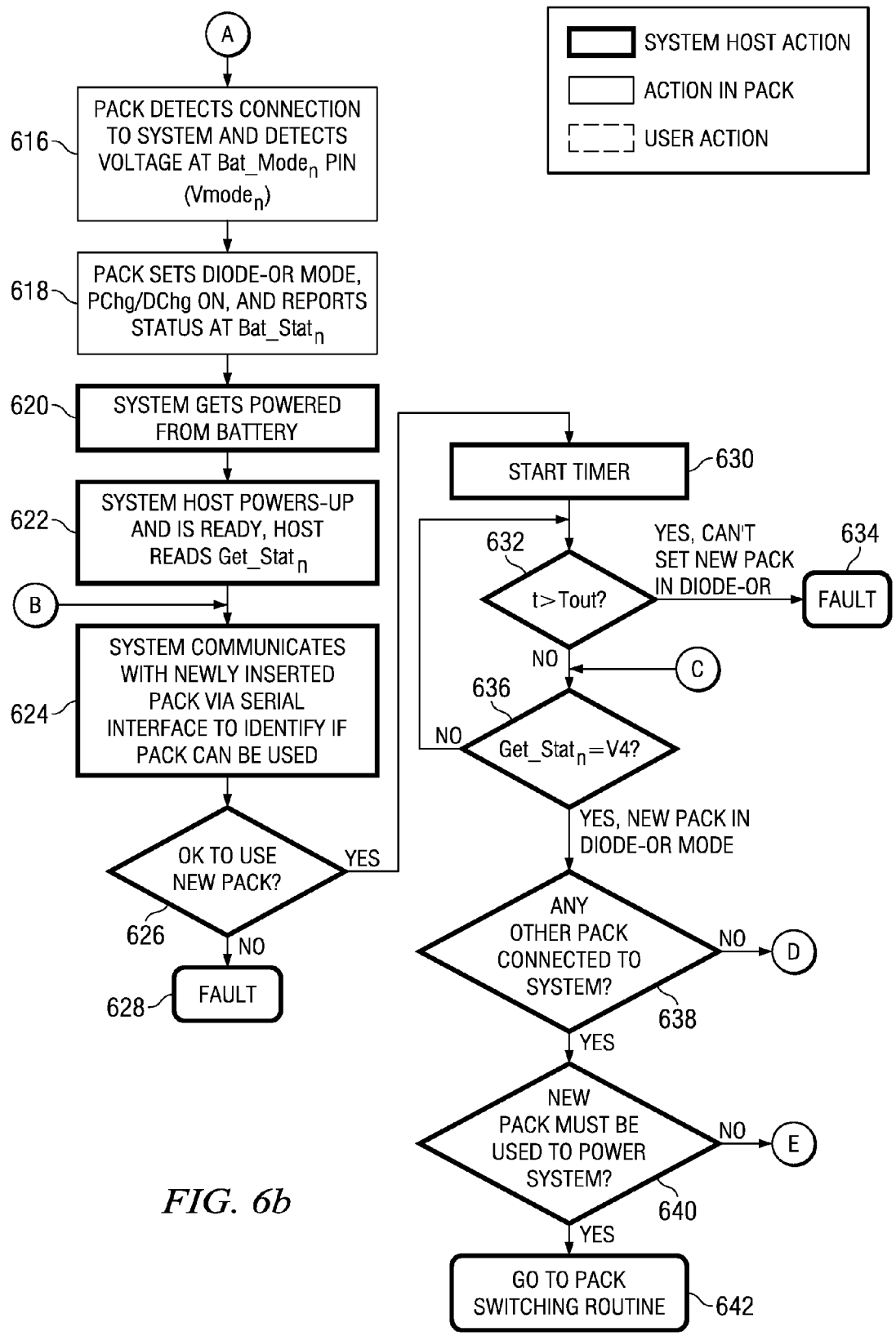
Figure 6C:
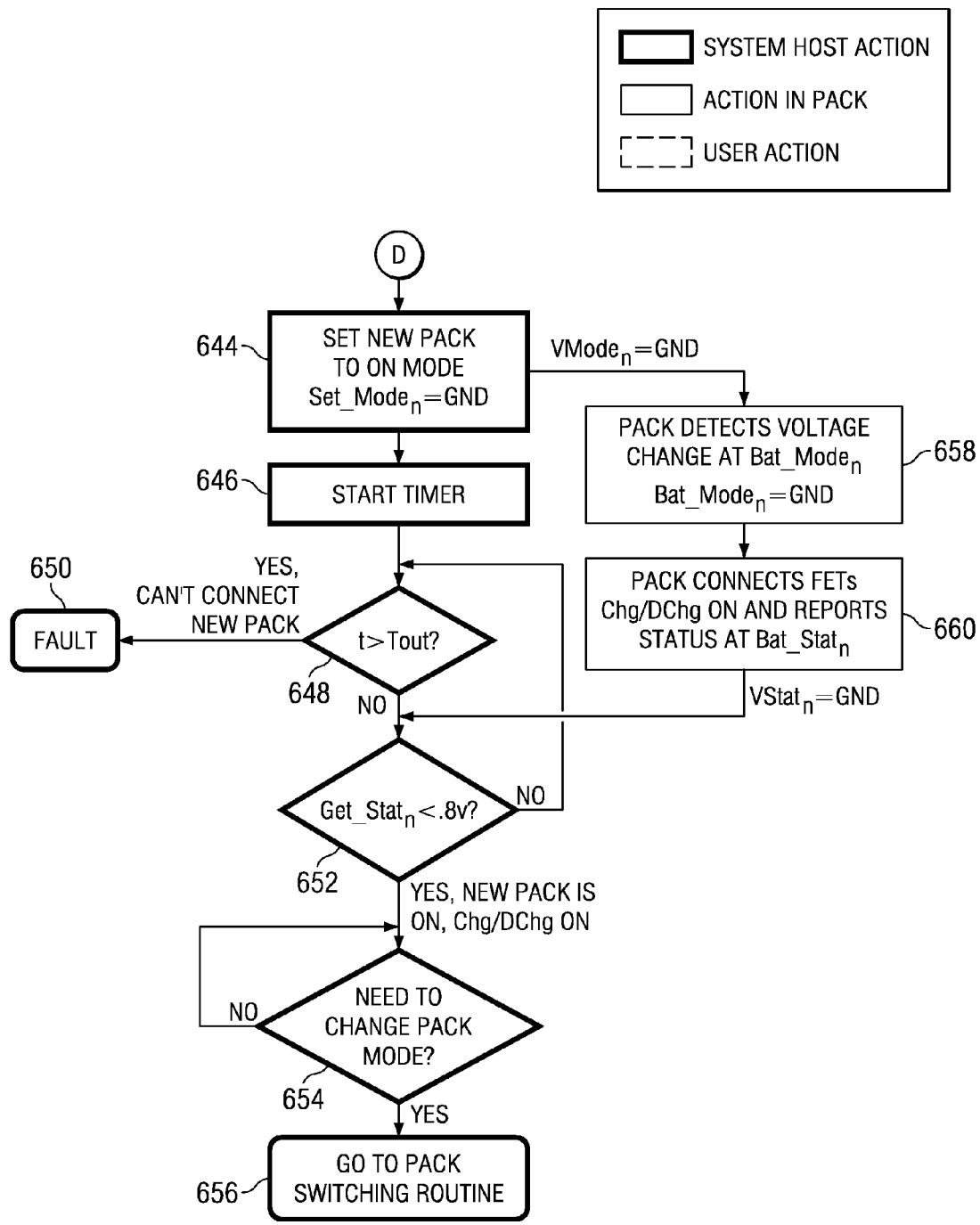

Referring to FIG. 6c, as indicated in box 644 the host processor 106 sets the first battery pack 102 to ON mode by controlling SWS3 to pull the $Set\_Mode_1$ signal to ground. Pulling $Set\_Mode_1$ to ground pulls $Bat\_Mode_1$ to ground. This action produces outputs at the Mode Function Voltage Detector 144 that are received by the BMU 152. The BMU 152 in turn provides inputs to the drivers 150 to turn on the charge MOSFET 300, to turn on the discharge MOSFET 302, and to turn off the precharge MOSFET 304.

A signal Vout (FIG. 3) is provided from a power supply (Battery Bus) to the drivers 150. In order to turn off one of the MOSFETS 300, 302, 304 the gate of the respective MOSFET is pulled to Vout. In order to turn on the respective MOSFET, the gate of the respective MOSFET is pulled below Vout.

After the host processor 106 sets the $Set\_Mode_1$ signal to ground, the host processor 106 starts a timer as depicted in box 646 and determines whether the $Bat\_Stat_1$ signal indicates that the charge and discharge MOSFETs have been turned on. More specifically, after the host processor 106 has started the timer the host processor 106 determines whether the timer has timed out as indicated in decision step 648. If the timer has timed out, the host processor 106 provides an indication of a fault condition as indicated in box 650. If the timer has not timed out, the host processor determines whether the $Get\_Stat_1$ signal is less than 0.8v as depicted in decision step 652.

After the host processor 106 turns on SWS3 to set $Set\_Mode_1$ to ground, as illustrated in box 658, the first battery pack 102 detects $Bat\_Mode_1$ equal to ground. In response to this condition, as indicated in box 660, the BMU 152 controls drivers 150 to turn on the charge and discharge MOSFETs 300, 302, and to turn off the precharge MOSFET 304. The Vgs logic 148 then controls the status function circuitry 142 to set $Bat\_Stat_1$ to ground which in turn causes $Get\_Stat_1$ to be at ground.

If the host processor 106 determines that the $Get\_Stat_1$ signal is at ground indicating that the charge and discharge MOSFETs have been turned on within the timeout period as indicated in decision step 652, control passes to decision step 654. The host processor 106 remains in this state until a determination is made by the host processor 106 that there is a need to change the pack mode. If the host processor 106 determines that a change in pack mode is required, control passes to a pack switching routine as illustrated in box 656. The pack switching routine is illustrated in FIG. 8 and is discussed subsequently.

Figure 6D:
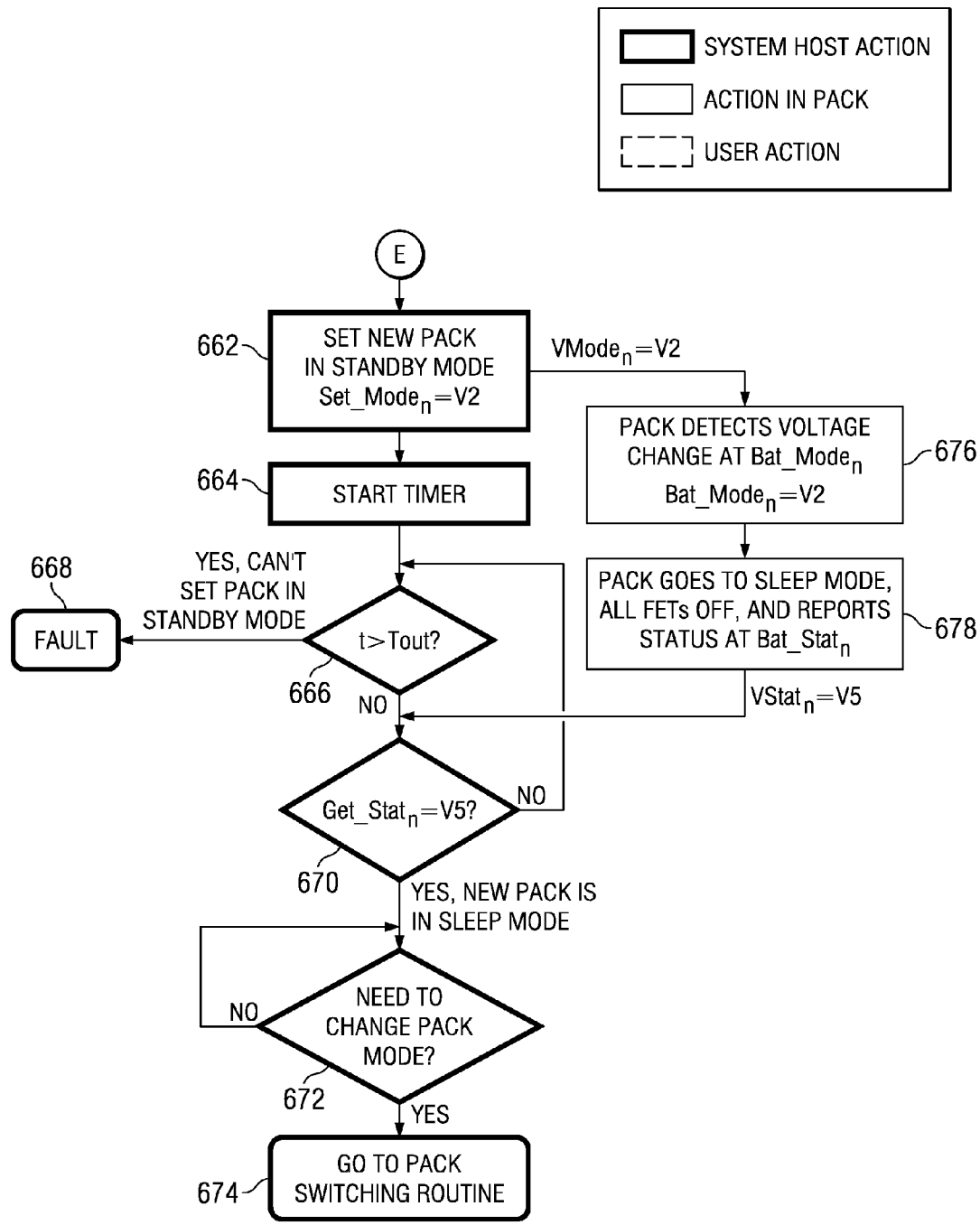

If in decision step 638 (FIG. 6b) it is determined that another pack (i.e. the second pack 104 in the present example) was already connected to the system electronics 100, control passes to decision step 640 where a determination is made whether to use the previously inserted pack 104 or the newly inserted pack 102. If it is determined in decision step 640 that there is no need to use the new pack 102 to power the system electronics 100, control passes to box 662 (FIG. 6d). As indicated in box 662, the host processor 106 controls the mode control circuitry 118 for the new pack 102 (the first battery pack in the illustrated example) to set Set_Mode$_1$ equal to V2. Setting Set_Mode$_1$ to V2 represents a command to set the newly inserted pack 102 to the standby mode in which all pack selector switch MOSFETs are off.

After the host processor 106 sets Set_Mode$_1$ to V2, host processor 106 initiates a timer to determine whether the first battery pack has assumed the standby mode (all selector switch MOSFETs off) within the predetermined time period. If the timer times out before the host processor is able to confirm via the Get_Stat$_1$ signal that the second battery pack has been set to the standby mode, the host processor 106 generates a fault condition as indicated in box 668.

After the host processor 106 sets the signal Set_Mode$_1$ to V2, the first battery pack 102 detects that voltage at the Bat_Mode$_1$ input to the voltage detector as indicated in box 676. In response, the BMU 152 controls the drivers 150 to turn off all selector switch MOSFETs 300, 302, 304. Once the selector switch MOSFETs 300, 302, 304 have been turned off, the status function circuitry 142 responsive to the Vgs logic 148 sets Bat_Stat$_1$ equal to V5.

As indicated in decision step 670, the host processor 106 determines that the selector switch MOSFETs are all off by detecting the presence of V5 at Get_Stat$_1$ and control passes to decision step 672. In decision step 672 the host processor inquires whether there is a need to change the mode of the battery pack. In the absence of a need to change the mode of the battery pack, the host processor 106 and pack remain in the current state. In response to a determination of a need to change the pack mode, control passes to box 674. The host processor 106 then proceeds through a pack switching routine as illustrated in FIGS. 7a, 7b, 8a and 8b.

Pack Switching Routine

Figure 7A:
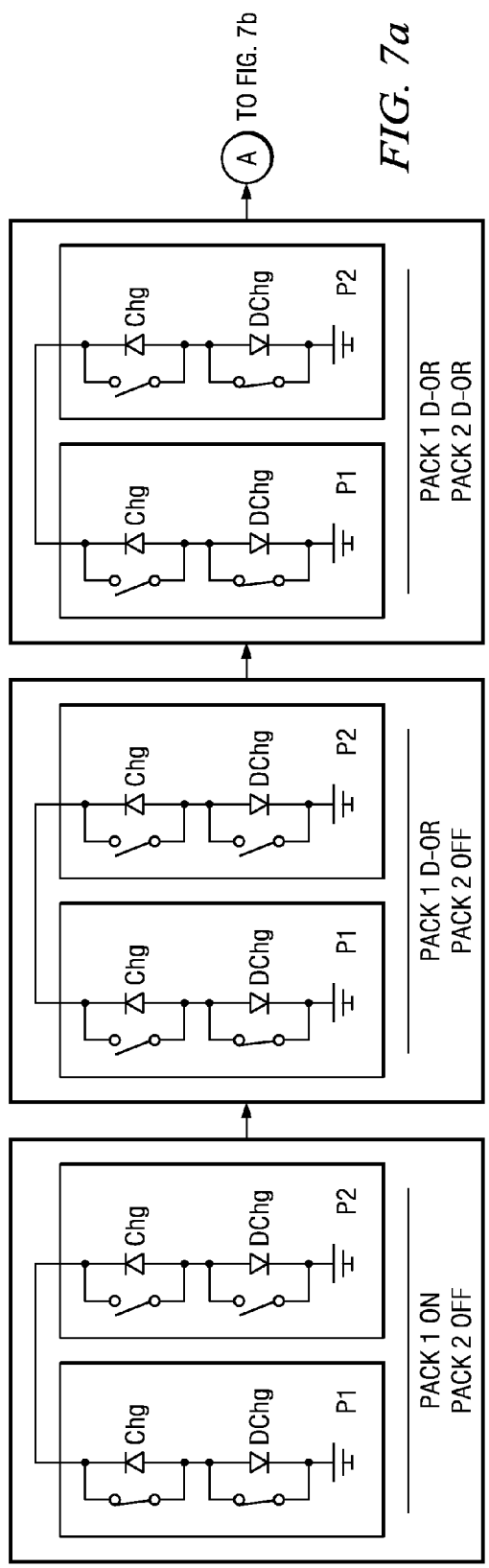
FIGS. 7a and 7b depict MOSFET switching within the selectors of the respective battery packs when sequencing from the first battery pack to the second battery pack in the system depicted in FIG. 1.
Figure 7B:
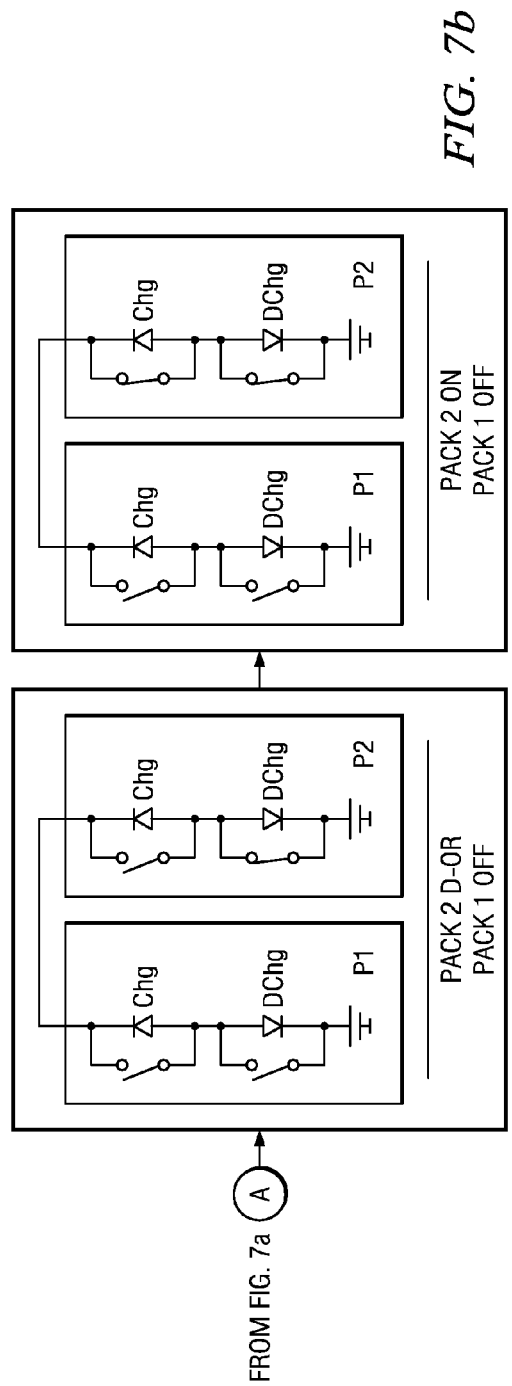

To avoid shoot through currents between battery packs when switching from one battery pack to another battery pack, the host processor 106 controls the MOSFET selector switches 300, 302 as indicated in FIGS. 7a-7b. The sequence that is illustrated in FIGS. 7a-7b involves switching from the first battery pack 102 being the active pack to the second battery pack 104 being the active pack. It should be appreciated that a similar process is undertaken when switching from the use of the second battery pack 104 to the first battery pack 102.

Figure 8A:
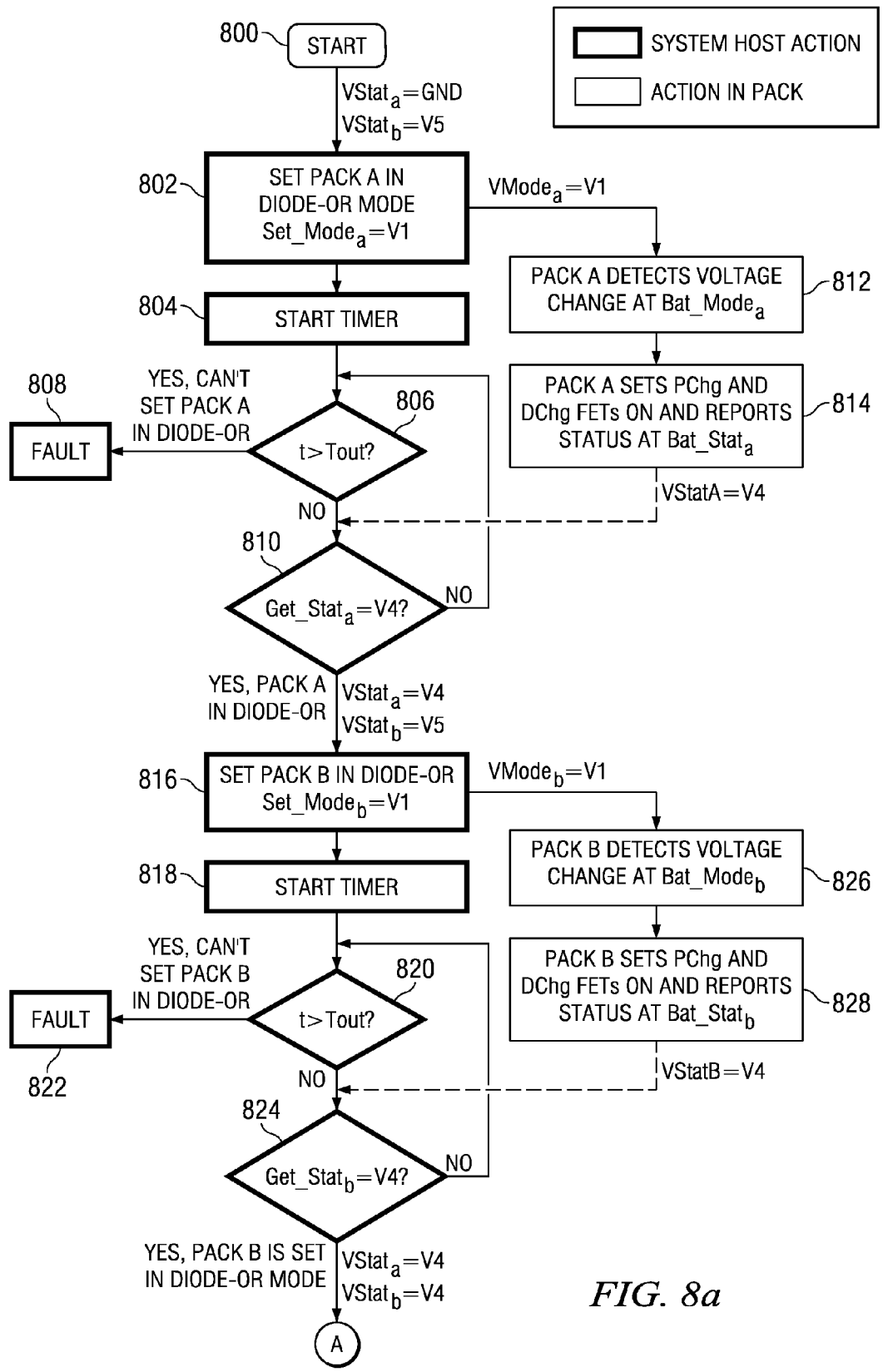
FIGS. 8a and 8b depict a flowchart depicting the sequencing of the pack control signals during a pack switching sequence.
Figure 8B:
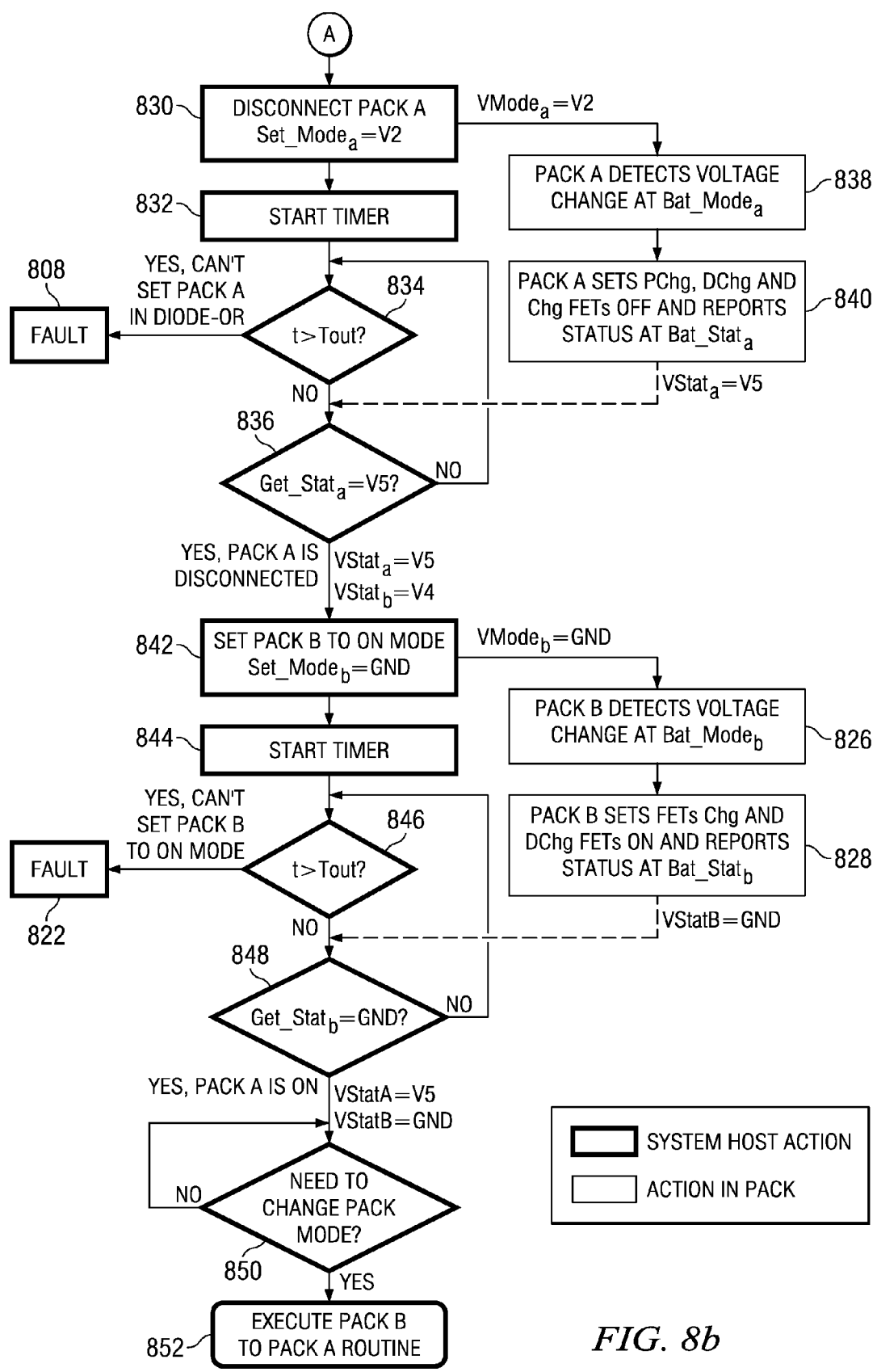

FIGS. 8a-8b illustrate a pack switching routine in which one battery pack is deselected and another battery pack is selected. If it is assumed that battery pack A is the first battery pack 102 and that battery pack B is the second battery pack 104 in the flow chart of FIGS. 8a-8b, the flow chart depicts the de-selection of the first battery pack 102 and the selection of the second battery pack 104. If it is assumed that battery pack A is the second battery pack 104 and that battery pack B is the first battery pack 102, the flow chart depicts the de-selection of the second battery pack 104 and the selection of the first battery pack 102.

Pack switching starts at box 800 as indicated in FIG. 8a. When switching from pack A to pack B the selector switches in battery pack A are initially in the ON state as reflected by VStat$_a$=Gnd and the selector switches in pack B are initially in the OFF state as indicated by VStat$_b$=V5. As indicated in box 802, the host processor 106 sets pack A in the diode-or mode by controlling the mode of function circuitry 118 to set Set_Mode$_a$=V1. The host processor 106 then starts a timer as indicated in box 804 so that the host processor 106 can determine whether the selector switches in pack A have changed to the diode-or state prior to the timeout of the timer. As indicated in decision step 806, if the timer times out before the host processor 106 detects Get_Stat$_a$=V4 indicating that the selector switches for pack A are in the diode-or state, the host processor 106 determines that pack A cannot be set to the diode- or state. In this circumstance, the host processor 106 generates a fault indication as indicated in box 808.

When the mode function circuitry 118 generates Set_Mode$_a$=V1 under the control of the host processor 106 as indicated in box 802, the VMode$_a$ signal equals V1 and pack A detects the voltage V1 at Bat_Mode$_a$ as indicated at box 812. In response to the detection of the voltage V1 at the mode function voltage detector 144, the selector switches within pack A are set to the diode-or mode with the charge MOSFET 300 in the OFF state and the discharge MOSFET 302 in the ON state as indicated in box 814. The mode function circuitry 142 within pack A generates the status signal Bat_Stat$_a$=V4 which in turn causes VStat$_a$ to equal V4.

As indicated in decision step 810, if the host processor 106 determines that Get_Stat$_a$=V4 within the timeout period indicating that the pack A selector switches have transitioned to the diode-or mode, control passes to box 816 and the host processor 106 controls the mode function circuitry 118 within the pack B interface 114 to generate an output signal Set_Mode$_b$=V1. The Set_Mode$_b$ signal propagates to pack B as VMode$_b$=V1 which causes the Bat_Mode$_b$ signal at the input to the pack B mode function voltage detector 144 to equal V1 as indicated in box 826. In response, pack B sets the pack B precharge MOSFET 304 and the pack B discharge MOSFET 302 to the ON state to establish the diode-or state for the selector switches. Pack B generates the signal Bat_Stat$_b$=V4 which is received by the status function voltage detector 116 in the pack B interface 114 as the signal Get_Stat$_b$=V4.

Following the generation of the diode-or mode signal Set_Mode$_b$=V1 as indicated in box 816, the host processor 106 initiates a timer as indicated at box 818 and determines whether the timer has timed out before the host processor detects the transition of the selector switches to the diode-or state. More specifically, as indicated at decision step 820, if the timer times out before confirming that the pack B selector switches have transitioned to the diode-or state, the host processor 106 generates a fault indication as indicated at box 822. If the host processor 106 determines that the pack B selector switches have transitioned to the diode-or state before the timer has timed out as indicated in decision step 824, control passes to box 830 (FIG. 8b).

As indicated at box 830, the host processor controls the mode function control circuitry 118 to set Set_Mode$_a$=V2 to cause pack A to set the selector switches to the OFF state. Following the generation of the control signal Set_Mode$_a$=V2, the pack A mode function voltage detector 144 detects the input signal Bat_Mode$_a$=V2 as indicated at box 838 and pack A turns off all pack A selector switches as indicated at box 840. Pack A reports the status of the selector switches to the system electronics as $VStat_a=V5$ to signal the host processor 106 that the pack A selector switches are in the off state.

When the host processor 106 determines that the pack A selector switches are in the OFF state as indicated in decision step 836, control passes to box 842.

As indicated at box 842, the host processor initiates the sequence to place the selector switches in pack B in the ON state in which both the charge and discharge MOSFETs 300, 302 are on by controlling the mode function circuitry 118 in the system electronics 100 so that $Set\_Mode_b=Gnd$. The host processor 106 then initiates a timer as indicated in box 844 and determines whether the timer has timed out before receiving confirmation that the selector switches in pack B have been turned on as illustrated in decision steps 846, 848. If the timer times out before the host processor 106 receives confirmation that the selector switches have transitioned to the ON state, the host processor 106 generates a fault indication as depicted in box 822.

The pack B mode function voltage detector receives the $Bat\_Mode_b=Gnd$ signal via the interface signal $VMode_b$ as indicated in box 828 and pack B sets the charge and discharge MOSFETS 300, 302 to the on state as indicated in box 828. Pack B reports the selector switch status to the status function voltage detector 116 as $VStat_b=Get\_Stat_b=Gnd$.

As depicted in decision step 848, upon confirming that the selector switches in pack B have transitioned to the ON state, control passes to decision step 850. The host processor 106 then determines whether there is a need to change the selected pack and remains in that state until such a need is identified. Upon identifying a need to change the selected pack, the host processor 106 executes a routine to select pack A and to deselect pack B.

In the foregoing manner the system electronics may be powered via one of two battery packs that include selector switches only on the battery packs. By providing selector switches only on the battery packs and not on the system electronics, additional voltage drops due to selector switches on the system electronics that reduce the effective battery life are avoided.

It should be apparent, that any technique for multimode and multistate signaling may be employed for conveying the mode and status information over respective single wire interfaces. While resistive voltage dividers are described for use in the mode function circuitry in the mode function circuitry 112 and the status function circuitry 142 to establish the $Bat\_Stat_n$ voltage under certain conditions, it should be appreciated that current sinks may be employed in the status function circuitry 142 and the mode function circuitry 112 to generate appropriate voltage levels at thee signal lines $Get\_Stat_n$ and $Bat\_Mode_n$. Alternatively, status and mode function information may be communicated as a serial data stream from the system electronics and packs for receipt by an appropriate data receivers located in the packs and the system electronics respectively.

Furthermore, in the presently disclosed embodiment, the status and mode signals $VStat_n$ and $VMode_n$ have one of three distinct states, and the $Bat\_Mode_n$ and $Get\_Stat_n$ signals have one of four distinct states, the extra state corresponding to the circumstance in which the battery pack is not connected to the system electronics. It should be appreciated that a greater number of states may be provided generally in the manner described herein should a need for the generation of a greater number of states exist.

It will also be appreciated by those of ordinary skill in the art that modifications to and variations of the above-described system and method for sequencing power in a dual battery pack system may be employed without departing from the inventive concepts disclosed herein. Accordingly, the invention should not be viewed as limited except by the scope and spirit of the appended claims.

What is claimed is:

1. A system for controlling at least one battery pack comprising:
   system electronics including a host processor; and
   at least one battery pack containing a battery;
   at least one interface for coupling said system electronics to said at least one battery pack, said interface including a mode control signal interface for communicating a mode control signal from said host processor to the respective battery pack wherein said mode control signal interface comprises a single wire interface;
   each of said at least one battery pack including selector switches for controlling the delivery of power from said battery to said system electronics, wherein each of selector switches has an on state in which the switch is closed and conducts current and an off state in which the switch is open and does not conduct current;
   said system electronics further including mode control circuitry responsive to control signals from said host control processor for generating said mode control signal, wherein said mode control signal has one of at least three mode control states specified by said host processor control signals and wherein said mode control signal for each of said at least three mode control states is an analog signal having a magnitude within a predetermined range that does not overlap the predetermined range for other mode signal states;
   said at least one battery pack being operative to establish the on/off states of the selector switches within the respective battery pack in response to receipt of said mode control signal.

2. The system of claim 1 wherein said system electronics include a voltage regulator for producing a regulated DC voltage and said selector switches of said at least one battery pack have an output that is directly coupled to said voltage regulator through a steering diode when said at least one battery pack is mechanically and electrically coupled to said system electronics via the interface between the system electronics and the respective battery pack.

3. The system of claim 1 wherein:
   said interface between said at least one battery pack and said system electronics further includes a status signal interface for communicating a status signal from the respective battery pack to said system electronics;
   said at least one battery pack includes status function circuitry in communication with said selector switches and said status signal interface; and
   said status function circuitry is operative to generate said status signal responsive to the on/off state of said selector switches, wherein said status signal generated by said status function circuitry has one of at least three status states determined by said status function circuitry, wherein said status signal for each of said at least three status states is an analog signal having a magnitude within a predetermined range that does not overlap the predetermined range for other status states.

4. The system of claim 3 wherein said mode control signal interface and said status signal interface between each of said at least one battery pack and said system electronics comprises a single wire interface.

5. The system of claim 3 wherein said system includes first and second battery packs.

6. The system of claim 3 wherein said system electronics include a voltage regulator for producing a regulated DC voltage and selector switches of said at least one battery pack have an output that is directly coupled to said voltage regulator through a diode when said at least one battery pack is mechanically and electrically coupled to said system electronics via the interface between the system electronics and the respective battery pack.

7. The system of claim 3 wherein said host processor is operative to control said mode control signal interface to produce said mode control signal and to determine from said status signal whether said selector switches have transitioned to a predetermined state specified by said mode control signal.

8. The system of claim 7 wherein said host processor is operative to generate a fault indication in the event said host processor determines from said status signal within a predetermined time period that said selector switches have not transitioned to said state specified by said mode control signal.

9. A method of controlling a battery pack comprising:

generating a mode control signal having one of at least three possible mode control states in response to control signals from a host processor within system electronics and communicating said mode control signal to said battery pack, wherein said mode control signal for each of said at least three mode control states is an analog signal having a magnitude within a predetermined range that does not overlap the predetermined range for other mode control signal states wherein a conveying step comprises a step of communicating said mode control signal from said system electronics to said battery pack via a single wire interface; and in response to receipt of said mode control signal at said battery pack, controlling the on/off states of selector switches within said battery pack, wherein said selector switches control the switching of power from a battery within said battery pack to said system electronics.

10. The method of claim 9 further including:

generating a status signal within said battery pack that has one of at least three status signal states indicative of the on/off states of said selector switches, wherein said status signal for each of said at least three status signal states is an analog signal having a magnitude within a predetermined range that does not overlap the predetermined range for other status signal states;

communicating said status signal to said system electronics via a status signal interface;

analyzing the selector switch state communicated to said system electronics via said status signal with said host processor to determine if said on/off states of said selector switches corresponds to said on/off states of said selector switches specified by said mode control signal; and generating a fault indication via said host processor in the event said on/off states of said selector switches indicated by said status signal do not correspond with said on/off states of said selector switches specified by said mode control signal within a predetermined time period from the generation of said mode control signal.

11. The method of claim 10 wherein said step of communicating said mode control signal to said battery pack comprises the step of communicating said mode control signal from said system electronics to said battery pack via a first single wire interface and said step of communicating said status signal to said system electronics comprises the step of communicating said status signal to said system electronics over a second single wire interface.

12. The method of claim 9 wherein said selector switches have an output that is directly coupled to a voltage regulator within said system electronics through a steering diode and said battery pack is operative in response to selected ones of said at least three predetermined mode control signals to apply power directly to said to said voltage regulator through said steering diode.

* * * * *